June 13, 1961 P. H. PAYNE 2,987,854
METHOD FOR FORMING NECK FINISHES ON GLASS CONTAINERS
Filed Nov. 27, 1957 3 Sheets-Sheet 2
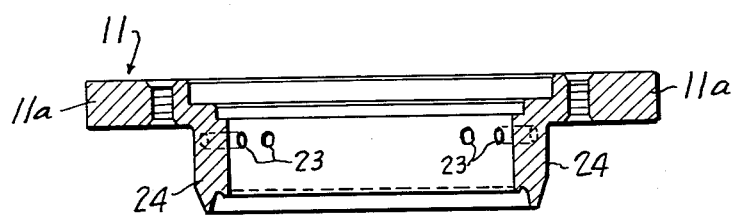
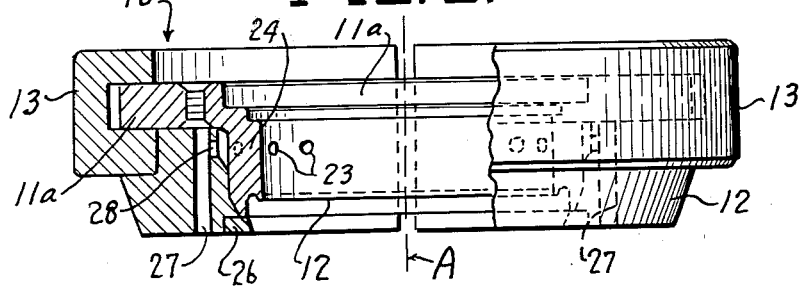
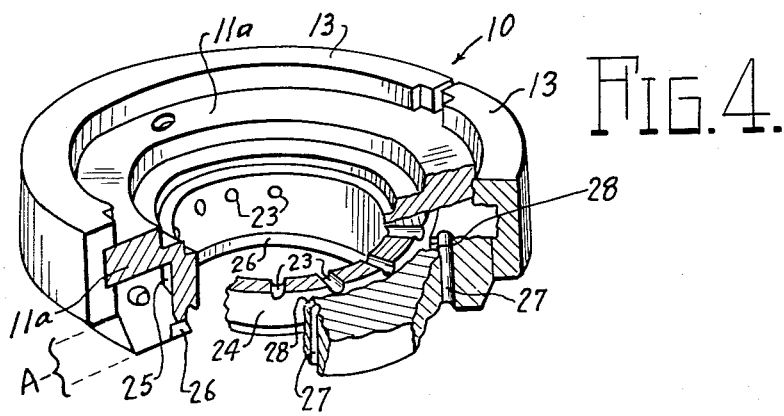
INVENTOR.
Paul H. Payne
BY
J. R. Nelson &
W. A. Schaich
ATTORNEYS June 13, 1961   P. H. PAYNE   2,987,854
METHOD FOR FORMING NECK FINISHES ON GLASS CONTAINERS
Filed Nov. 27, 1957   3 Sheets-Sheet 3

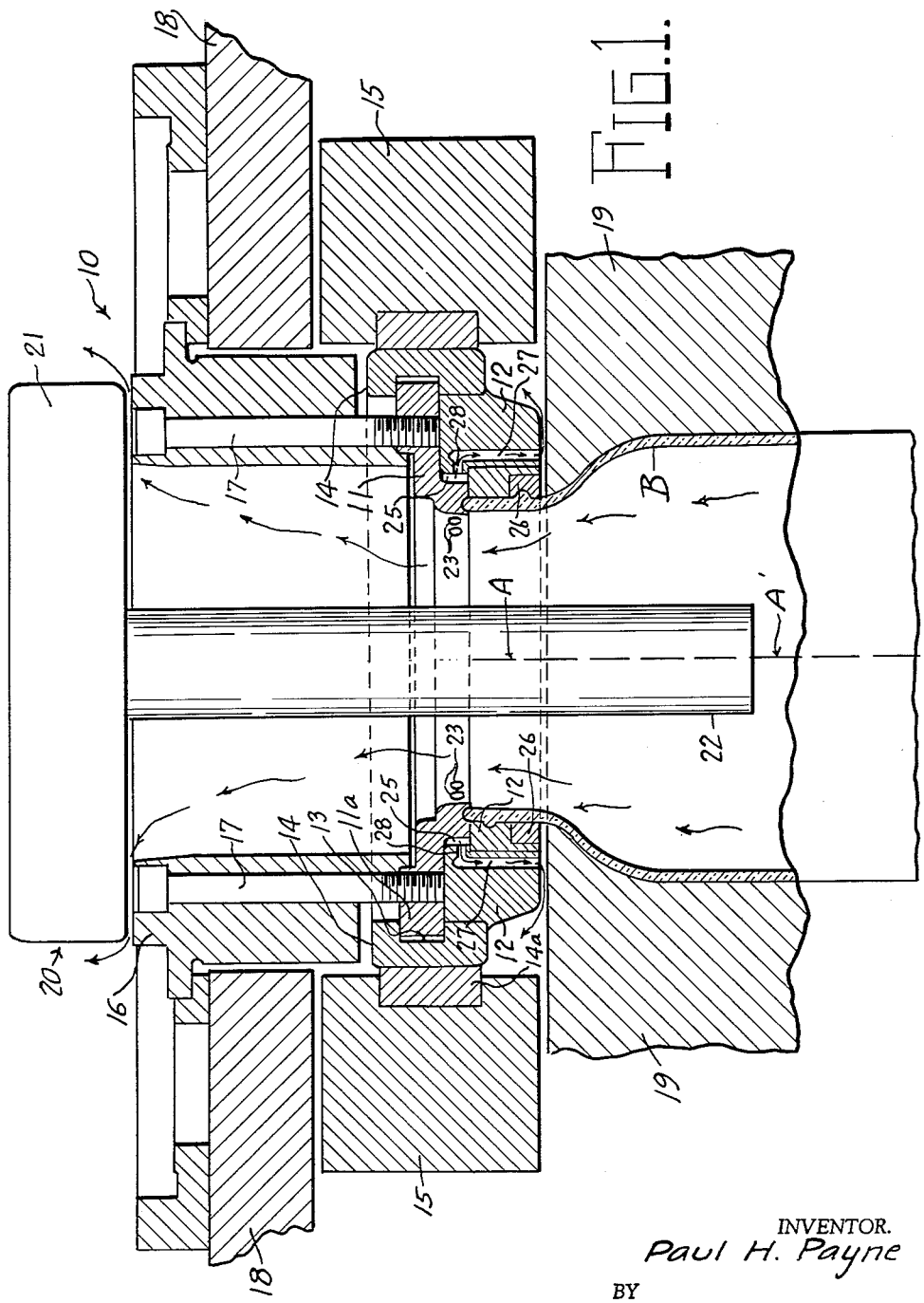

INVENTOR.
Paul H. Payne
BY
J. R. Nelson &
W. A. Schaich
ATTORNEYS

United States Patent Office 2,987,854
Patented June 13, 1961

2,987,854
METHOD FOR FORMING NECK FINISHES ON GLASS CONTAINERS

Paul Holland Payne, Bridgeton, N.J., assignor to Owens-Illinois Glass Company, a corporation of Ohio
Filed Nov. 27, 1957, Ser. No. 699,254
7 Claims. (Cl. 49—80)

The present invention relates to neck mold apparatus on glass forming machines for manufacturing glass containers, such as bottles, jars, and the like, and more particularly to method for prevention of out-of-round of neck finish of the containers manufactured by these machines and eliminate "off-gauge" finishes in such containers.

The invention is particularly applicable to the manufacture of wide mouth or intermediate neck size containers, as contrasted to narrow neck containers, but the invention need not be limited in its application to this use.

Wide mouth containers are conventionally manufactured by the press and blow process, in which the initial step is that of pressing a parison from a gob of glass in a partible blank or parison mold and a partible neck mold, the latter defining the exterior contour of the neck finish of the finished container.

Pressing is accomplished by a reciprocating plunger operating through the center opening of the neck mold to press the glass against the blank mold and against the glass contacting surfaces of the neck mold. The plunger, when fully inserted in the blank, defines the interior molding surface of the neck finish. The formed parison has a finished neck portion and integral body blank which is conventionally transferred to a blow mold where the body blank is expanded by blowing to the finished shape of container.

At the time of the transfer to the blow mold, the glass in the neck finish is in process of setting-up or cooling to change its physical characteristics from a highly viscous plastic state, assimilating the viscosity of warm taffy, to a solid.

One of the difficulties prevalent at this point in the process is that the neck finish, after the plunger is withdrawn from the neck mold, is distorted and develops an out-of-round configuration. Out-of-round of the neck, if it exceeds the established very narrow tolerances, results in off-gauge ware unfit for commercial use. These tolerances are determined by the ability to apply a suitable closure and obtain an acceptable seal.

It has been found that out-of-round almost invariably occurs on a diameter of the neck finish that is displaced 90° from its "mold seam" diameter. This latter diameter is a diameter of the neck approximately on a vertical plane through the central axis of the container and is the plane at which the neck molds part or are opened and closed. It is generally the case, that after the glass in the neck has set-up, its mold seam diameter, due to greater shrinkage in setting-up, is less than the diameter normal to the mold seam. The degree of shrinkage during setting-up of the glass is believed attributable directly to the rate of cooling the glass. At the mold seam diameter, the mold seam tends to vent the air between the pressed glass and the glass contacting surface of the neck mold so that the glass and the metal of the mold have a more intimate contact than exists near the diameter normal to the seam. At this latter diameter, an air film occurs between the glass and the metal, and since the metal of the mold is a better heat conductor than the air film, the result is that the glass is cooled at a higher rate and consequently sets up faster and shrinks to a greater extent adjacent the mold seam.

It is an object of the invention, therefore, to provide method for differentially cooling the neck mold adjacent the diameter normal to the mold seam to give a comparable rate of cooling to that existing adjacent the mold seam and thereby equalize the shrinkage at both diameters to prevent out-of-round on the finished neck of the container.

Another object of the invention is to provide an improved method for circulating fluid through the neck mold adjacent its glass contacting surface in annular zones contained within the limits of an arc of a circle no greater than a quadrant of a circle centered at opposite sides of the neck on the diameter of the neck normal to the mold seam.

A further object of the invention is to provide a method for utilizing some blow air introduced through the neck mold during the final blowing step of the forming process in carrying out the aforementioned objects.

Other objects and advantages will become apparent to those skilled in the glass forming art from the following description, taken in conjunction with the annexed sheets of drawings, on which, by way of preferred example only, are illustrated two forms of the invention.

On the drawings:

FIG. 1 is a sectional elevational view of the invention on a neck mold assembly in position over a blow mold of a press and blow glass forming machine and shows the utilization of blowing air to cool part of the neck mold during blow forming process wherein a glass container is blown to shape.

FIG. 2 is a sectional elevational view of a guide ring for the neck mold assembly.

FIG. 3 is a sectional elevational view of the neck mold assembly with its partible neck ring partially open and illustrates one arrangement of the air passages in the neck ring.

FIG. 4 is a perspective view, partly in section, showing a cut-away view of assembled neck mold assembly of one form of the invention.

Figure 5:
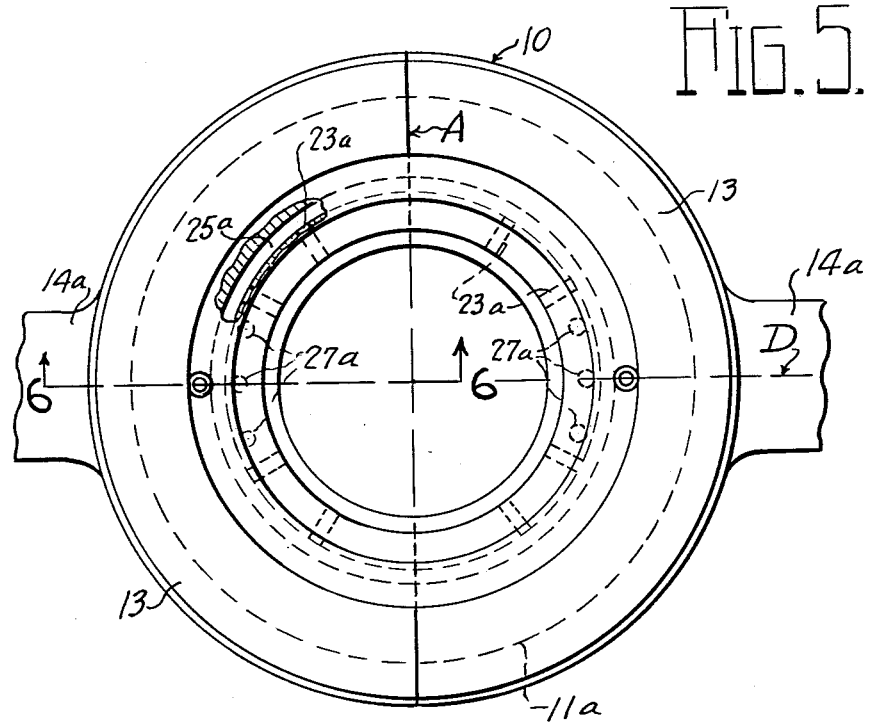
FIG. 5 is a plan view of the neck mold assembly, showing the neck rings closed and illustrates arrangement of the air passages of another form of the invention.

Referring now to the figures, it is seen on FIG. 1 that the neck mold assembly, referred to generally at 10, includes a thimble or guide ring 11 for guiding the opening and closing of a partible neck ring 12. Neck ring 12 opens and closes about parting line A, which is the mold seam line for the neck finish of the container, and is guided in this movement by the flange 11a which fits in the annular groove 13 of the neck ring arm 14. The neck ring arm 14 is connected at lug 14a as part of the neck ring arm assembly 15 operated by the turret mechanism (not shown) of the glass forming machine, in the conventional manner.

Axially adjacent the guide ring 11 is a guide ring bushing 16 for locating the position of the guide ring 13. The guide ring 11 is rigidly fastened to the bushing 16 by studs 17 threaded into its flange 11a. The bushing 16 is mounted on transfer arms 18 of the turret of the machine. The turret operates in sequence between a blank station, where a gob of molten glass is received and pressed to a parison in a blank mold by a plunger that reciprocates in and out of the center bore of the bushing 16, guide ring 11, neck ring 12 and blank mold (not shown); a blow mold station, where the parison is blown to final shape in a partible blow mold 19 (FIG. 1); and a take-out station where the finished container is released from the neck mold and taken from the machine. The foregoing is, by way of example, but one type of glass forming apparatus on which the invention may be applied.

As mentioned, FIG. 1 illustrates the mechanism at the blow mold station. The parison is transferred there while held at its pressed neck finish by the neck ring 12, and enclosed in a partible blow mold 19 closed along its parting line, indicated at A'. A blow head assembly 20, which includes a blow head casing 21 and blow air tube 22, is lowered onto the top of bushing 16 to enclose its open end and injects the blow air tube 22 into the hollow portion of the parison. Air under pressure is connected into the blow head casing 21 and tube 22 and the body of the parison is then blow formed to its finished shape B. During blowing, a pressure is built up on the interior space in the bushing. Some of the air is flushed therefrom by leakage past the blow head casing 21 and the top of the bushing 16, as indicated by the arrows on Fig. 1. It is preferred also, as part of the present invention, to utilize some of this blow air for circulation past the neck rings glass contacting surface by means and in a manner to be presently described.

In FIG. 2, one form of the apparatus of the invention is presented. Guide ring 11 has a plurality of holes 23 bored laterally vertically through its vertical wall portion 24. This forms a means defining a fluid passage through the guide ring for conducting fluid to an annular channel lying under flange 11a, to be presently described. The holes 23 may be bored at any radial spacing desired, in fact one hole will be sufficient, but it is preferred to provide eight holes consisting of four $5/32$ inch holes spaced $22\frac{1}{2}°$ apart and directly under the flange 11a of the guide ring on opposite sides of the guide ring and through its wall portion 24 so that the holes are spaced two on either side of the diameter of the guide ring which lies normal to the mold seam diameter. This mold seam diameter is defined by the manner in which the neck ring 12 is assembled. In other words, the parting line A for the neck ring, which is the mold seam diameter, will lie 90° from this aforementioned normal diameter when the neck ring is assembled to the guide ring.

In FIGS. 3 and 4, the neck ring 12 and guide ring 11 are shown assembled to make up the neck mold assembly 10. When the neck ring 12 is closed about the guide ring 11 there is defined an annular channel 25 therebetween, which extends in endless fashion around the outer vertical surface of the guide wall's vertical wall portion 24. The bored holes 23 will, thusly, communicate with the annular channel 25.

A hardened metal insert 26 is generally provided at the lower end of the glass contacting surface of the neck rings 12. This insert is most generally of a Colmonoy alloy of metal and its use is well known in the glass forming art.

In each half of the neck ring 12 are drilled two vertical holes 27. In this particular form of the invention, the holes are drilled as close as permissible to the Colmonoy inserts 26 so as to be practically contiguous with it opposite its glass contacting surface. The holes 27 are drilled to a sufficient height so that they extend opposite the annular channel 25. Corresponding horizontal holes 28 are bored to connect the annular channel 25 with the holes 27.

As shown on FIG. 4, the holes 27 and corresponding holes 28 are spaced equal radial distances measured from the central axis of the neck mold assembly 10. In determining the positioning of the air circulating passages 27, they should be disposed at least 45° off of the mold seam diameter. They may be equally spaced apart and their centers on equal radii measured from the center axis of the neck ring, but it is contemplated that they may be otherwise arranged to gain advantages in neck mold cooling.

The spacing of the holes 27 along the neck ring 12 is an important feature of the invention and should be kept within a critical range, as will now be described. The number of fluid passages as holes 27 will depend upon the type of neck finish for the jar being formed. Their location should be confined within an annular zone that has its center on the diameter normal to the mold seam A and its end extremities are at least 45° off the mold seam. In this connection, the minimum span of the zone to which the cooling fluid has been applied and been found to operate satisfactorily is a zone spanning an arc of about 5° at each half of the neck ring and centered on the diameter thereof normal to its mold seam. It is believed that the maximum span of the zone that will be effective is a zone spanning an arc of about 90° at each neck ring half and centered on this said normal diameter. If the zone exceeds this latter-mentioned arc, it will tend to add to the cooling rate existing at the mold seam area, which will tend to have an unbalancing effect on cooling the finish and tend to intentionally promote an out-of-round condition of the formed neck finish.

As shown on FIG. 4, two holes are drilled on centers that are $3/4$ inch from each side of a horizontal centerline normal to the mold seam A and at a radius of $1 5/8$ inches. To put it another way, the ratio of this radius measured to the center of the holes 27 to the spacing between their centers is approximately 1 to 1.

Referring now to FIGS. 1 and 4, blowing air is circulated vertically of the neck ring and adjacent its glass contacting surface in the following manner. Final blow air for blow forming the parison enters the bored holes 23 in guide ring 11 and is conducted to the annular chamber 25 where it is circulated thereabouts to the horizontally bored holes 28 in the neck ring, thence to the connecting vertically bored holes 27. This circulation of air, as it is directed through the neck ring, cools the metal of the neck ring and its Colmonoy insert. In this manner, the mold around the holes 27 will be cooled and thereby extract heat from the glass at that zone at a faster rate and will compensate for the higher rate of heat extraction, as previously pointed out herein, that occurs adjacent the mold seam.

By using blowing air to circulate to cool the neck ring, as mentioned above, increases the flushing action of the blowing air in the blow mold and will increase the cooling of the glass being formed in the blow mold. This is an advantageous feature.

Figure 6:
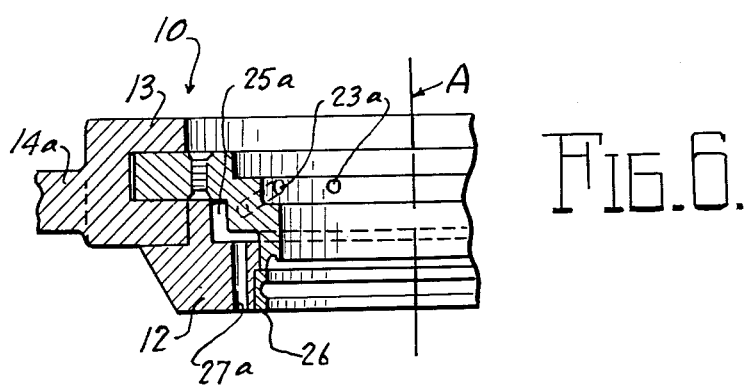
FIG. 6 is a partial elevational view, in section, taken along line 6—6 of FIG. 5.

Another form of the invention is presented by FIGS. 5 and 6. Here, the guide ring 11 is provided with obliquely bored holes 23a beginning at the inner surface of the guide ring 11 opposite its flange 11a and ending at the external vertical surface thereof under the flange. When the neck ring 12 is closed about the guide ring 11 along parting line A, an L-shaped annular channel 25a is defined under flange 11a. Bored holes 23a communicate with channel 25a (FIG. 6) to connect blowing air to it, as before. The vertical holes 27a are bored in the neck ring adjacent its glass contacting surface to communicate with the annular chamber 25a. In this form of the invention, the horizontal holes 28 described for the first described embodiment of the invention, are no longer necessary, due to the manner in which the neck ring and guide ring are fitted together to define the L-shaped channel 25a.

This neck mold assembly illustrates a different spacing arrangement of the vertically bored holes 27a. They are bored three in each half section of the neck ring and are spaced in comparable zones centered on the diameter D. The central hole 27a in each neck ring half is centered on the diameter and one hole 27a is spaced on either side of this centrally located hole. This is a preferred arrangement of the bored holes for forming a different design of wide mouth container neck finish. The holes 27a are of the order of $1/8$ inch in diameter and drilled on $3/8$ inch centers which are at a radius of $1 7/16$ inches from the central axis of the neck mold assembly 10. To put it another way the ratio of this radius to the spacing between the centers of the holes is approximately 4 to 1.

It should be obvious that the closer the fluid passages (27 or 27a) are to the glass contacting surface of the neck ring 12, the faster the rate of extraction of heat from glass that may be achieved. Moreover, it should be obvious that in practicing the method of the invention, fluid may be circulated in the zones spelled out and directed thereat against the outside surface of the neck ring whenever conditions make it practical. Likewise, it is contemplated that where, for this purpose, machined or other defined fluid passages are provided in the neck ring structure they may in certain circumstances be bored obliquely toward or away from the plane of the glass contacting surface of the neck ring to compensate for differentials in heat conductivity characteristics between metals of the mold, such as between cast steel or iron and Colmonoy.

It is suggested, however, that much is to be gained by using blow air for cooling the prescribed zones of the neck ring in that this increases the flushing action of the air used for blowing and consequently increases cooling internally of the container being formed.

Having illustrated two specific examples of neck molds with which the invention may be practiced effectively, it will, of course, be understood that various details of construction may be modified through a wide range without departing from the principles of this invention, and it is, therefore, not the purpose to limit the patent granted hereon otherwise than necessitated by the scope of the appended claims.

I claim:

1. The method of controlling symmetry of dimensions of the neck finish of glass containers formed by the process of blow molding a glass parison to the shape of said container, wherein the neck finish is formed and held by partible neck mold apparatus that is open and closed on a mold diameter defining a neck mold seam comprising circulating coolant within the partible neck mold adjacent its glass contacting surface, and directing said circulation of coolant to apply it effectively only through annular zones disposed on diametrically opposite sides of the said formed neck finish, the centers of said zones being on the diameter of said finish that is displaced 90° from the neck mold seam, to effect cooling the glass in the portion of the neck mold adjacent said zones comparable to the cooling rate of the glass in the portion of the neck mold disposed adjacent the neck mold seam.

2. The method defined in claim 1, wherein the coolant is circulated only during the blow forming portion of the forming process.

3. The method defined in claim 2, wherein the coolant comprises air under pressure obtained from the source utilized in performing the blow forming portion of the forming process.

4. The method of controlling symmetry of dimensions of the neck finish of said containers comprising circulating final blow air through the neck mold substantially longitudinally thereof adjacent its glass contacting surface and coextensive with the length of the neck finish to be formed therein during the blow forming process, and directing such circulation of air to apply it only through an annular zone in each half of the neck mold, the center of each said zone being on a radius of the neck mold normal to the mold seam and the annular extremities of said zone being displaced at least 45° from the mold seam, thereby effecting the rate at which the glass is cooled in the portion of the neck mold adjacent that zone comparable to the rate of cooling the glass in the portion thereof adjacent the mold seam.

5. The method of controlling symmetry of dimensions of the neck finish of a glass container wherein said finish is formed and held in a partible neck mold apparatus including complementary neck mold halves juxtapositioned along a neck seam diameter of the neck finish comprising applying differential cooling in the neck mold at annular zones on each of the mold halves, said zones each extending on opposite sides of a neck mold diameter lying normal to the mold seam diameter and the annular extremities of each said zone being displaced at least 45° from the mold seam diameter, the said cooling tending to effect a comparable rate of cooling of the glass finish in the neck mold adjacent said zones as the cooling thereof occurring adjacent the mold seam, whereby the shrinkage in the glass after removal from the mold will be substantially equalized to prevent out-of-round of the finished neck of the formed container.

6. The method of controlling symmetry of dimensions of the neck finish of a glass container, wherein said neck finish is formed initially in complementary partible neck mold halves that are closed about a diameter and at a time concurrent with the formation of a parison, and the parison held by said neck mold halves and transferred to and enclosed in a blow mold wherein the parison is blown to final shape, which comprises the step of cooling only a portion of the neck mold by circulating fluid internally through the neck mold halves opposite their glass contacting surfaces in annular zones on opposite sides of the neck mold, each said zone being defined within the limits of an arc of a circle that is not in excess of a quadrant of a circle, and each said zone being centered on a diameter of the neck mold perpendicular to the said diameter about which the neck mold halves are closed.

7. The method of controlling symmetry of the glass portion that is molded in a partible neck mold in the process for forming glass containers, wherein said container is shaped to final form by blow molding technique, the said neck mold being closed on a diameter of the neck finish, which comprises circulating blowing air applied for blow molding the glass container to final shape through only a portion of the neck mold to apply said air to cool the neck mold in defined annular zones at opposite sides of the neck finish, the said zones each being within a quadrant of a circle centered on a diameter of the said neck finish that is perpendicular to the said diameter of closing said neck mold, the said circulation of the blowing air also enhancing an increase in the internal cooling effect that the blowing air has on the glass undergoing blow forming.

References Cited in the file of this patent

UNITED STATES PATENTS

| | | |
|---|---|---|
| 1,766,555 | Smith | June 24, 1930 |
| 1,958,859 | Palmer et al. | May 15, 1934 |
| 2,210,583 | Henry | Aug. 6, 1940 |
| 2,442,315 | Samuelson et al. | May 25, 1948 |
| 2,467,000 | Samuelson | Apr. 12, 1949 |
| 2,485,836 | MacConnell | Oct. 25, 1949 |
| 2,495,253 | Hayes | Jan. 24, 1950 |